United States Patent [19]

Carpenter

[11] Patent Number: 4,520,908

[45] Date of Patent: Jun. 4, 1985

[54] PRESSURE BALANCED VALVE FOR ADJUSTABLE HYDRAULIC DAMPER

[75] Inventor: Keith H. Carpenter, Kettering, Ohio

[73] Assignee: General Motors Corporation, Detroit, Mich.

[21] Appl. No.: 550,564

[22] Filed: Nov. 10, 1983

[51] Int. Cl.³ .............................. F16F 9/50; F16F 9/46
[52] U.S. Cl. ..................................... 188/319; 91/422; 91/447; 137/512.1; 137/614.2; 188/279; 188/299; 280/707
[58] Field of Search ............... 188/319, 266, 275, 279, 188/281, 282, 285, 299, 317, 322.15; 137/512.1, 614.2; 91/422, 447, 470; 280/707, 714

[56] References Cited

U.S. PATENT DOCUMENTS

| | | | |
|---|---|---|---|
| 1,135,923 | 4/1915 | Reynolds | 188/319 |
| 3,763,970 | 10/1973 | Anderson | 188/319 X |
| 4,298,102 | 11/1981 | Nishikawa et al. | 188/319 |
| 4,313,529 | 2/1982 | Kato et al. | 188/319 X |
| 4,337,850 | 7/1982 | Shimokura | 188/319 |
| 4,463,839 | 8/1984 | Ashiba | 188/299 |

Primary Examiner—Bruce H. Stoner, Jr.
Assistant Examiner—Robert J. Oberleitner
Attorney, Agent, or Firm—Saul Schwartz

[57] ABSTRACT

To assure adjustability under all internal pressure conditions a hydraulic damper having a hollow piston rod, a piston on the end of the rod slidable in a fluid filled tube and cooperating with the latter in defining inversely variable volume compression and rebound chambers, and at least two relief valves on the piston connected to the compression chamber for passing fluid thereto at two different levels of pressure relief, includes a right cylindrical valve spool in the piston rod bore rotatable between a plurality of control positions corresponding to pressure relief at the different relief pressure levels, first passages between the rebound chamber and the piston rod bore, second passages between each of the relief valves and the piston rod bore, first circumferentially symmetrically arrayed ports in the valve spool registerable with the first passages to always connect the rebound chamber to the valve spool, second circumferentially symmetrically arrayed ports in the valve spool to selectively connect respective ones of the relief valves to the valve spool, and a hollow tube through the valve spool open to the compression chamber to equalize pressure on opposite ends of the valve spool.

3 Claims, 5 Drawing Figures

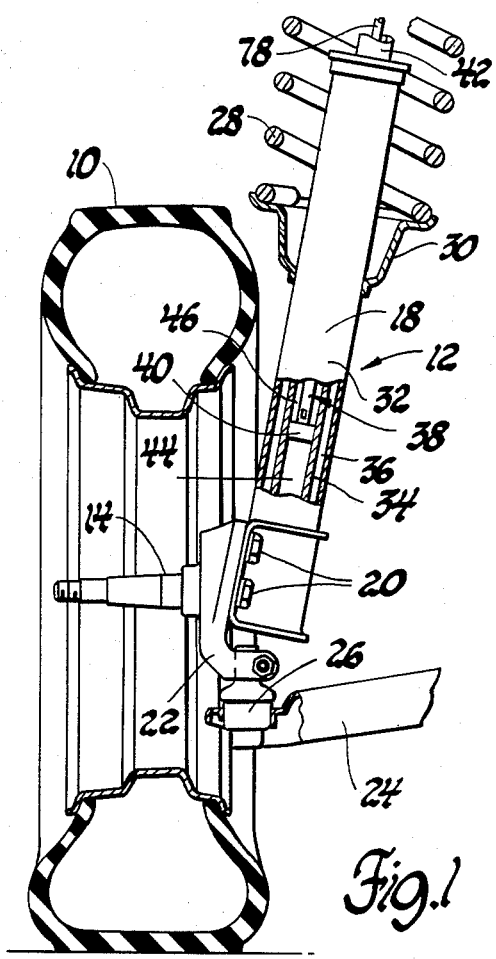

PRESSURE BALANCED VALVE FOR ADJUSTABLE HYDRAULIC DAMPER

BACKGROUND OF THE INVENTION

1. Field of the Invention

This invention relates generally to an adjustable vehicle shock absorber and, more particularly, to structure whereby the damping characteristic of a shock absorber is easily adjustable during operation.

2. Description of the Prior Art

Vehicle shock absorbers or dampers for hydraulically damping suspension excursions of a vehicle unsprung mass have been proposed with internal structure to change or adjust the shock absorber's damping characteristic so that optimum ride and handling can be achieved over a variety of surfaces. In some, adjustment requires relative rotation between a piston and rod assembly and a cylinder tube which is only accomplished when at least one end of the shock absorber is detached from the vehicle. In others, adjustment is effected without detachment from the vehicle through bulky and cumbersome auxiliary housings which complicate the structure and consume valuable space not readily available in vehicle suspension environments. In still others, adjusting structure is mounted directly on a piston and rod assembly of the shock absorber which assembly is normally attached to the sprung mass. Of these latter type structures, some have axially movable metering rods which progressively open and close orifices in passages between the rebound and compression chambers and some have rotatable control shafts which move valve plates for progressive covering and uncovering of bypass orifices between the compression and rebound chambers. Each of these structures, however, has a movable element with significant pressure unbalanced areas subjected to high working pressures during vehicle operation which could render it difficult or impossible to effect adjusting movement of the element under all vehicle operating conditions. A damper according to this invention includes novel structure whereby the damping characteristic of the unit is easily adjustable under all vehicle operating conditions.

SUMMARY OF THE INVENTION

Accordingly, the primary feature of this invention is that it provides a new and improved hydraulic damper especially for a vehicle shock absorber. Another feature of this invention is that it provides a new and improved damper the damping characteristic of which is easily adjustable during all vehicle operating conditions so that the damper is especially suited for use as a component of an active suspension system wherein a computer on the vehicle monitors the instantaneous pavement or ground condition and automatically adjusts the damper accordingly. Still another feature of this invention resides in the provision in the new and improved damper of a valve spool on a piston and rod assembly movable by a control rod on the piston and rod assembly between a plurality of control positions directing fluid from a rebound chamber to respective ones of a plurality of relief valves so that pressure in the rebound chamber is selectively relieved at various pressure levels, the valve spool being pressure balanced axially and radially for easy movement. A still further feature of this invention resides in the provision in the new and improved damper of a right cylindrical valve spool having a plurality of circumferentially symmetrical upper ports exposed to the rebound chamber in all control positions of the spool and a plurality of circumferentially symmetrical lower ports sequentially exposed to respective ones of the relief valves in corresponding ones of the control positions of the spool so that pressure relief of the rebound chamber occurs at various pressure levels corresponding to the pressure settings of the relief valves, the circumferential symmetry of the upper and lower ports assuring that the spool is internally radially pressure balanced. Yet another feature of this invention resides in the provision in the new and improved damper of an inner cylindrical wall extending axially through the valve spool from the compression chamber operative to equalize pressure at opposite ends of the spool so that the latter is externally axially pressure balanced.

These and other features of this invention will be readily apparent from the following specification and from the drawings wherein:

FIG. 1 is a partially broken away elevational view of a vehicle suspension system having a damper according to this invention;

FIG. 2 is an enlarged perspective view of a portion of FIG. 1 showing the valve spool on the piston and rod assembly;

FIG. 3 is an enlarged sectional view taken generally along the plane indicated by lines 3—3 in FIG. 2;

FIG. 4 is an enlarged sectional view taken generally along the plane indicated by lines 4—4 in FIG. 2; and FIG. 5 is a partially broken away perspective view of the valve spool.

Referring now to FIG. 1 of the drawings, a steerable road wheel 10 of a vehicle is connected to a body or sprung mass portion of the vehicle by a strut type suspension 12. The strut suspension 12 includes a steering knuckle 14 on which the wheel 10 is rotatably supported. The knuckle is rigidly attached to the lowermost extremity of a damper 18 according to this invention, as by bolts 20, and has a lower extension 22 to which a laterally extending control arm 24 is attached by a ball joint 26. The control arm 24 guides the steering knuckle relative to the vehicle sprung mass during vertical suspension excursions of the wheel 10. A coil spring 28 is disposed around the damper 18 and seats at its lower end on a platform 30 rigidly attached to the damper. The upper end of the spring seats in conventional fashion against a portion of the sprung mass of the vehicle, not shown, to effect resilient connection between the wheel 10 and the sprung mass.

With continued reference to FIG. 1, the damper 18 includes an outer cylindrical tube 32 to which the platform 30 is attached and an inner cylindrical tube 34 concentric with the outer tube 32 and rigidly attached thereto so that an annulus 36 extending generally the length of the tubes is formed therebetween. The damper 18 further includes a piston and rod assembly 38 which, in turn, includes a piston 40 slidable in the inner tube 34 and a hollow rod 42 rigidly attached to the piston. The piston and rod assembly is slidable in the inner tube 34 with the rod 42 projecting out of the upper end thereof. A conventional sliding seal, not shown, is provided between the rod and the upper end of inner tube 34 and both ends of the annulus 36 are also conventionally sealed. The upper end of the piston rod 42, not shown, is connected to the sprung mass of the vehicle so that the damper 18 cooperates with the control arm 24 in controlling vertical suspension excursions of the wheel 10. The piston 40 cooperates with the inner tube 34 and with a conventional foot valve, not shown, at the lower ends of the inner and outer tubes in defining a compression chamber 44 below the piston and with the inner tube 34 and piston rod 42 in defining an annular rebound chamber 46 above the piston and below the sliding seal at the top of the inner tube. The foot valve at the lower end of compression chamber 44 connects the latter with the annulus 36 which, accordingly, functions as a reservoir chamber in known fashion. The compression and rebound chambers 44 and 46 are completely filled with standard hydraulic fluid and communicate across the piston 40 through at least one compression chamber relief valve 47 and through a pressure balanced adjusting valve system according to this invention designated generally 48.

Referring particularly now to FIGS. 2 through 5, the piston rod 42 has an internal cylindrical bore 50 which is closed at the upper end of the rod and which is aligned with a bore 52 through the piston 40 when the rod is rigidly attached to the piston. Above the piston, the rod 42 includes a pair of diametrically opposed wide slots 54, FIG. 3, and a pair of smaller, diametrically opposed narrow slots 56 which provide communication between the bore 50 of the piston rod and the rebound chamber 46. At the piston 40, the compression chamber relief valve 47 includes a stepped bore 57 defining a lip 58 at the step. A check ball 59 is disposed in the bore 57 and seats on lip 58. A relatively light spring 60 seats against the ball 59 and against a retainer 61 on the piston and urges the ball against the lip. The ball 59 unseats easily in response to pressure build-up in compression chamber 44 but seats tightly against lip 58 in response to build-up of pressure in rebound chamber 46.

The pressure balanced adjusting valve system 48 includes three circumferentially symmetrically arrayed radial stepped bores 62, 62' and 62", FIGS. 2 and 4, extending between the bore 52 and the outer diameter of the piston, the bores including three circular lips 63, 63' and 63" formed at the steps in the bores. An annular slot 64 in the piston 40 concentric with the bore 52 intersects each of the stepped bores 62, 62' and 62" radially outboard of the circular lips 63, 63' and 63" so that the bore 52 is connected to the compression chamber 44 through the slot 64 and each of the stepped bores.

The valve system 48 further includes a right cylindrical valve spool 65 closely received in the piston rod bore 50 and the piston bore 52 for rotation relative to each. The spool 65 includes an outer cylindrical wall 66, a concentric and hollow inner cylindrical wall 68, an annular upper wall 70 rigidly interconnecting the inner and outer cylindrical walls at the top of the spool and an annular lower wall 72 likewise rigidly interconnecting the inner and outer cylindrical walls at the bottom of the spool. The inner and outer and the upper and lower walls cooperate in defining an annular volume 73 within the valve spool. A plurality of circumferentially symmetrically arrayed upper ports 74 through the outer cylindrical wall 66 correspond in number to and register with the slots 54 and 56 in the piston rod 42 thereby connecting the rebound chamber 46 to the annular volume 73. The slots 54 and 56 overlap some or all of the upper ports 74 at all angular positions of the valve spool relative to the piston rod so that continuous communication between the rebound chamber 46 and the annular volume 73 is assured. A plurality of circumferentially symmetrically arrayed lower ports 76, 76', 76" and 76''' through the outer cylindrical wall 66 of the valve spool sequentially register with respective ones of the stepped bores 62, 62' and 62" in the piston at corresponding ones of a plurality of control positions of the valve spool. With any one of the lower ports in register with one of the stepped bores, communication is established between the annular volume 73 and the compression chamber 44 through the lower port, the stepped bore, and the annular slot 64. Accordingly, a fluid flow path is established across the piston 40 through the valve spool. A control rod 78 projects from above the piston rod 42 down through a balance chamber 79 therein above the valve spool and inside the inner cylindrical wall 68 of the valve spool. A seal, not shown, seals the upper end of the balance chamber but allows rotation of the control rod 78 relative to the piston rod 42. A plurality of spokes 80 rigidly interconnect the control rod 78 and the inner cylindrical wall so that the valve spool 65 and the control rod 78 are rotatable as a unit within the aligned bores 50 and 52.

As seen best in FIGS. 2 and 4, a plurality of check balls 82, 82' and 82" are disposed in respective ones of the stepped bores 62, 62' and 62", respectively, and seat against corresponding ones of the circular lips 63, 63', 63" defined at the steps in the bores. A plurality of coil springs 84, 84' and 84" in respective ones of the stepped bores seat at outboard ends against inner cylindrical tube 34 and at inboard ends against corresponding ones of the check balls 82, 82' and 82" thereby biasing the check balls against the circular lips. Each of the springs 84, 84' and 84" has a different rate and preload so that the check balls are biased with varying force against the circular lips.

With respect, now, to operation of the suspension 12 and the damper 18 and assuming the valve spool 65 is initially positioned as shown in FIGS. 2, 3 and 4, with lower port 76''' in register with stepped bore 62", irregularities in the road surface cause vertical jounce excursions of the wheel 10 which flex spring 28 in compression through steering knuckle 14, outer tube 32 and platform 30. Simultaneously, the inner and outer tubes 34 and 32, respectively, move relative to the piston and rod assembly 38 so that the relative volumes of the compression and rebound chambers 44 and 46, respectively, vary inversely, the compression chamber decreasing in volume and the rebound chamber expanding. Balls 82, 82' and 82" seated on lips 63, 63' and 63" prevent fluid from flowing into the annular volume 73 of the valve spool during jounce. However, because spring 60 in compression chamber relief valve 47 is light, ball 59 lifts off of lip 58 so that fluid flows freely across the piston from the compression chamber into the rebound chamber without any appreciable retardation of the upward velocity of the wheel 10 due to passage of the fluid. As the piston rod 42 projects further into the inner tube 34 during jounce, a volume of fluid corresponding to the increased volume of the piston rod within the inner tube is expelled through the foot valve into the reservoir formed in the annulus 36.

At the end of the jounce excursion of wheel 10, spring 28 forces outer tube 32 in the opposite direction relative to the piston rod 40 tending to decrease the volume of the rebound chamber and expand the compression chamber. Immediately, ball 59 in compression chamber relief valve 47 seats on lip 58 to prevent passage of fluid in the opposite direction from the rebound chamber 46 to the compression chamber 44. Momentarily, then, fluid is trapped in the rebound chamber because heavy springs 84, 84' and 84" hold balls 82, 82' and 82" on the lips 63, 63' and 63", respectively. Accordingly, fluid pressure in rebound chamber 46 rapidly increases until it reaches a level sufficient to unseat ball 82″ in stepped bore 62″ from lip 63″ at which instant fluid pressure in the rebound chamber is relieved and fluid is throttled through the orifice defined between the unseated ball 82″ and lip 63″. The inner tube 34 is thus allowed to extend in controlled fashion relative to the piston and said assembly 38 as compression chamber 44 expands and rebound chamber 46 contracts. As the piston rod 42 withdraws from the inner tube 34, fluid is drawn through the foot valve from the reservoir in the annulus 36 to fill the void.

The level at which pressure in rebound chamber 46 is relieved is adjustable by valve spool 65. For example, in the position of valve spool 65 shown in FIG. 4, lower port 76‴ registers with stepped bore 62″ while the other two stepped bores 62 and 62′ are effectively sealed relative to annular volume 73 of the spool. Accordingly, the level at which the pressure in rebound chamber 46 is relieved during rebound of wheel 10 is a function of the rate of spring 84″. When the valve spool 65 is rotated counterclockwise by control rod 78 from the position shown in FIG. 4 through an angle of approximately 30°, lower port 76 is brought into alignment or registry with the stepped bore 62 while the other two stepped bores are sealed relative to the annular volume in the valve spool so that a different level of pressure relief for the rebound chamber 46 is achieved proportional to the rate of spring 84 which differs from that of spring 84″ in the stepped bore 62″. Similarly, if the control rod 78 rotates the valve spool 64 counterclockwise approximately another 30°, lower port 76′ is brought into alignment with stepped bore 62′ so that still a third level of pressure relief for the rebound chamber 46 is achieved proportional to the rate of spring 84′. Finally, by rotation of the valve spool counterclockwise approximately another 30°, lower port 76″ is brought into alignment with stepped bore 62″ so that the initial level of pressure relief for the rebound chamber 46 is reestablished.

The damper 18 is particularly adapted for use in an active type suspension system wherein an onboard computer monitors instantaneous ground or road conditions through sensors on the sprung and unsprung masses of the vehicle. The computer operates mechanism on the sprung mass, not shown, connected to the control rod 78 which mechanism rotates the rod to adjust the level of pressure relief for the rebound chamber as conditions dictate. To insure that the valve spool is easily rotatable by the rod 78 regardless of the instantaneous pressure conditions prevailing in the damper, valve spool 65 is both axially and radially pressure balanced.

More particularly, in a jounce excursion of the wheel 10 fluid in compression chamber 44 is pressurized and forced through relief valve 47 into the rebound chamber wherein substantially no pressure increase occurs. At the same time, compression chamber pressure acts on lower wall 72 of the valve spool and an upper wall 70 of the valve spool through the inner cylindrical wall 68 of the latter which allows fluid to circulate up from the compression chamber into the balance chamber 79 above the spool. Because the upper and lower walls of the valve spool are parallel and have the same area exposed to compression chamber pressure, the axially directed forces acting on the spool are equal in magnitude and opposite in direction so that the spool itself is externally axially pressure balanced.

As jounce turns to rebound, pressure in the rebound chamber 46 and in the annular volume 73 of the valve spool 65 increase rapidly. In the annular volume 73, rebound chamber pressure acts radially inwardly on and completely around the inner cylindrical wall 68 and radially outwardly on and completely around outer wall 66 of the spool and axially on both the upper and lower walls. Because the upper and lower walls 70 and 72 are identical, the valve spool 65 is internally axially pressure balanced. Being cylindrical and without any openings, the inner cylindrical wall 68 is also inherently internally radially pressure balanced. Likewise, above and below and between the upper and lower ports 74 and 76, respectively, the outer cylindrical wall 66 is inherently internally radially pressure balanced. In the planes of the upper and lower ports 74 and 76, however, internal radial pressure balance on the outer cylindrical wall is not inherent and is specifically achieved by locating the ports in circumferentially symmetrical arrays around the outer wall. That is, where the number of ports is even, as in the case of the four upper ports 74 and the four lower ports 76, circumferential symmetry results in each port being diametrically opposite another port so that, with the ports equal in size and shape, the areas between the ports on which internal fluid pressure acts are balanced by identical diametrically opposite areas so that overall internal radial static balance is achieved. Where the number of ports is odd, a condition not illustrated herein, circumferential symmetry locates the ports with equal angular spacing around the outer wall so that, while the areas on which fluid pressure acts do not have diametrically opposite corresponding areas, the equal spacing of the ports produces resultant forces which are equal in magnitude and radially directed through the center of the valve spool. Accordingly, internal radial static balance on the outer wall 66 at the lower ports is again achieved.

With respect to external radial pressure balance, spool 65 is closely received in rod bore 50 and piston bore 52 so that the outer wall 66 is not exposed to potential external fluid pressure except where the spool registers with slots 54 and 56 and stepped bores 62, 62′ and 62″. At the stepped bores, no fluid pressure exists because of check balls 82, 82′ and 82″ except in the one of the stepped bores aligned with one of the lower ports so that the stepped bores do not represent a source of external radial pressure unbalance. At the slots 54 and 56 in the piston rod, however, potential external radial pressure unbalance exists because rebound chamber pressure is directed through the slots against the valve spool. To assure external radial static balance, the slots 54 and 56 equal the number of upper ports 74 and are circumferentially symmetrically arrayed around the piston rod 42. The result is that overlaps between the upper ports 74 and the slots 54 and 56 will occur with opposite diametrical correspondence which, in turn, forecloses development of radial, external pressure unbalance.

As seen best in FIGS. 3, 4 and 5, a minor source of axial pressure unbalance is introduced at the unbalanced area of control rod 78 because only one end thereof is exposed to compression chamber pressure. However, because the valve spool 65 is otherwise in static pressure balance, the forces necessary to move the spool under all operating conditions are not excessive. Accordingly, the cross sectional area of the control rod 78 and the unbalance introduced thereby can be maintained manageably small.

While the valve spool has been illustrated as being rotatable through a plurality of control positions, it will be apparent that axial movement between control positions can also be accommodated. Likewise, while three stepped bores have been illustrated providing three separate levels of pressure relief, it is understood that fewer or greater stepped bores may be employed and that the stepped bores may be arranged for individual operation, as shown, or for simultaneous operation in combination with other ones of the stepped bores. Equally apparent is the fact that while damper 18 is incorporated in a strut type suspension system 12, it is similarly applicable to other known vehicle suspension systems such as conventional long arm-short arm systems.

The embodiments of the invention in which an exclusive property or privilege is claimed are defined as follows:

1. In an adjustable hydraulic damper including a piston and rod assembly slidably disposed in a fluid filled cylinder tube and defining therewith inversely variable volume compression and rebound chambers on opposite sides of said assembly and further including at least two relief valve means on said assembly operative to pass fluid to one of said compression and said rebound chambers when respective pressures on said relief valve means exceed corresponding ones of a pair of predetermined relief pressures, the combination comprising, means defining a cylindrical bore in said assembly, first passage means through said assembly between said bore and the other of said compression and said rebound chambers, second passage means between said bore and each of said relief valve means, a hollow right cylindrical valve spool in said bore movable between at least two control positions corresponding to pressure relief at each of said predetermined relief pressures, tube means on said spool extending axially therethrough and open to said one chamber operative to equalize pressure on opposite ends of said spool for axial pressure balance, a first plurality of circumferentially symmetrically arrayed upper ports through said spool intermediate its ends registerable with said first passage means in each of said spool control positions to admit fluid from said other chamber to said spool, a second plurality of circumferentially symmetrically arrayed ports through said spool intermediate its ends selectively registerable with respective ones of said second passage means in respective ones of said spool control positions for directing fluid to corresponding ones of said relief valve means thereby to effect selective pressure relief of said other chamber at either of said predetermined relief pressure levels, the circumferential symmetry of said upper and said lower ports effecting internal radial pressure balance on said spool, and control means connected to said valve spool operative to move said valve spool between said control positions.

2. In an adjustable hydraulic damper including a piston rod, a piston rigidly attached to said piston rod slidably disposed in a fluid filled cylinder tube and defining therewith inversely variable volume compression and rebound chambers on opposite sides of said piston, and at least two relief valves on said piston connected to said compression chamber operative to pass fluid thereto when respective pressures on said relief valves exceed corresponding ones of a pair of predetermined relief pressure levels, the combination comprising, means defining a cylindrical bore in said piston rod, first passage means through said rod between said bore and said rebound chamber, second passage means through said piston between said bore and each of said relief valves, a hollow right cylindrical valve spool disposed in said bore for rotation about the longitudinal axis of said bore between at least two control positions corresponding to pressure relief at each of said predetermined relief pressure levels, a tube on said spool extending axially therethrough and open to said compression chamber operative to equalize pressure on opposite ends of said spool for axial pressure balance, a first plurality of circumferentially symmetrically arrayed ports through said spool intermediate its ends registerable with said first passage means in each of said spool control positions to admit fluid from said rebound chamber to said spool, a second plurality of circumferentially symmetrically arrayed ports through said spool intermediate its ends selectively registered with said second passage means in respective ones of said spool control positions for directing fluid to corresponding ones of said relief valves thereby to effect selective pressure relief of said rebound chamber at either of said predetermined relief pressure levels, the circumferential symmetry of said upper and said lower ports effecting internal radial pressure balance on said spool, and control means connected to said valve spool operative to rotate said spool between said control positions.

3. In an adjustable damper including a hollow piston rod defining an internal cylindrical bore having a closed end and a distal open end, a piston rigidly attached to said piston rod adjacent said distal end and slidably disposed in a substantially vertically oriented fluid filled cylinder tube and defining therewith inversely variable volume compression and rebound chambers on opposite sides of said piston, and at least two relief valves on said piston connected to said compression chamber operative to pass fluid thereto when respective pressures on said relief valves exceed corresponding ones of a pair of predetermined relief pressure levels, the combination comprising, means defining, a circumferentially symmetrical array of first passages through said piston rod between said piston rod bore and said rebound chamber, a pair of radial passages through said piston between said piston rod bore and respective ones of said relief valves, a hollow right cylindrical valve spool disposed in said piston rod bore for rotation about the longitudinal axis of the latter between at least two control positions corresponding to pressure relief at each of said predetermined relief pressure levels, means on said spool defining a tube aligned on said piston rod bore longitudinal axis extending axially through said valve spool and open to said compression chamber operative to equalize pressure on opposite ends of said valve spool for axial pressure balance, a plurality of circumferentially symmetrically arrayed upper ports through said valve spool intermediate its ends registerable with said first passages in each of said valve spool control positions to admit fluid from said rebound chamber to said spool, means defining at least two pairs of diametrically opposed lower ports through said valve spool intermediate its ends with at least one port of each pair being registerable with a respective one of said pair of radial passages in respective ones of said valve spool control positions for directing fluid to corresponding ones of said relief valves thereby to effect selective pressure relief of said rebound chamber at either of said predetermined relief pressure levels, the circumferential symmetry of said upper ports and diametral opposition of said lower ports effecting internal radial pressure balance on said spool, a control rod supported on said piston rod for rotation about the longitudinal axis of said piston rod bore, and means rigidly connecting said control rod to said valve spool so that rotation of said control rod rotates said valve spool between said control positions.

* * * * *